Nov. 20, 1945.  F. R. TABERLET  2,389,565
NON-METALLIC SEPARABLE FASTENER AND METHOD OF MAKING THE SAME
Filed Nov. 5, 1942  3 Sheets-Sheet 1
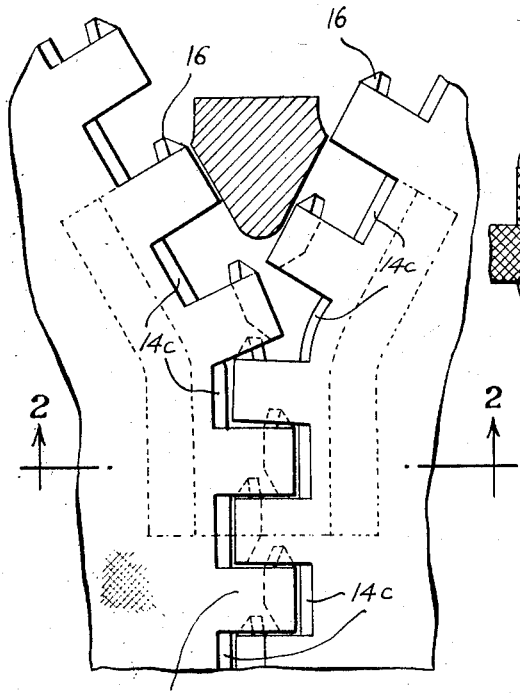
FIG.1.
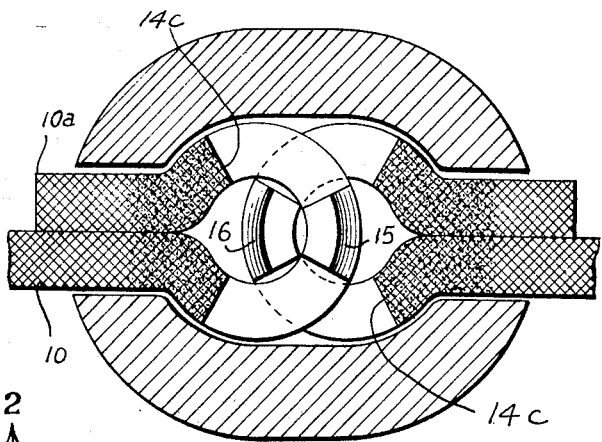
FIG.2.
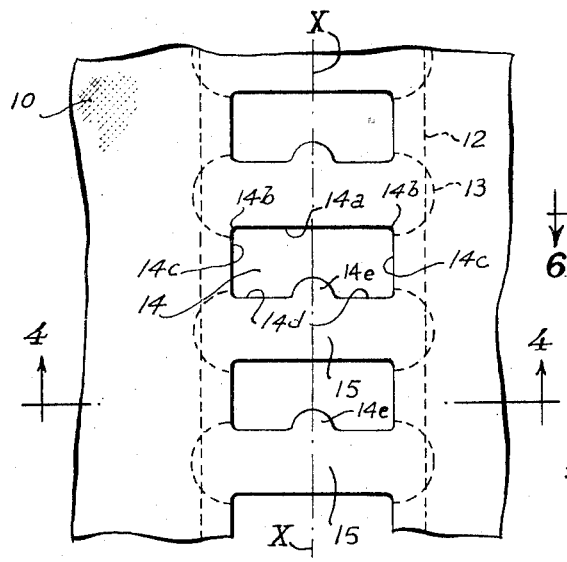
FIG.3.
FIG.4.
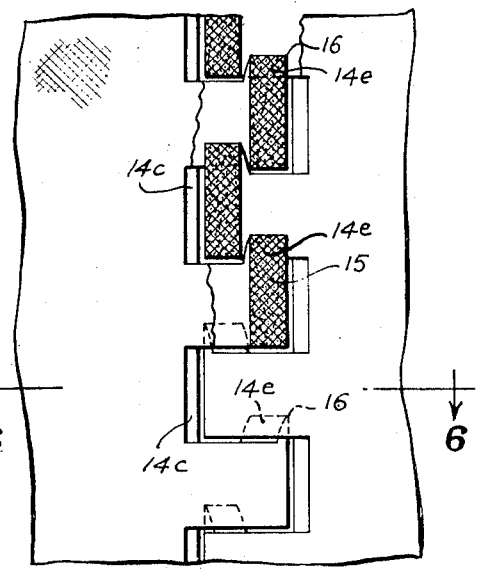
FIG.5.
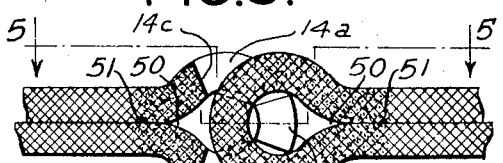
FIG.6.
INVENTOR.
FRED R. TABERLET
BY
C. P. Goepel
ATTORNEY INVENTOR.
FRED R. TABERLET
BY
C. P. Goepel
ATTORNEY Nov. 20, 1945.     F. R. TABERLET     2,389,565
NON-METALLIC SEPARABLE FASTENER AND METHOD OF MAKING THE SAME
Filed Nov. 5, 1942     3 Sheets-Sheet 3
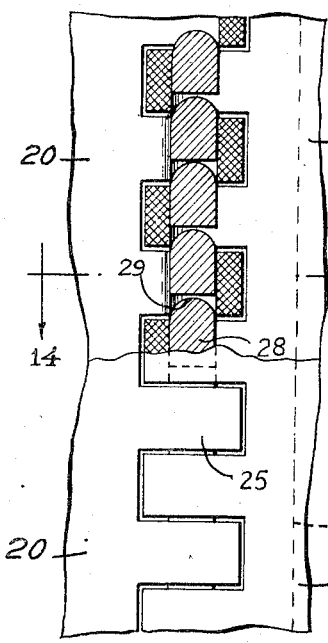
FIG.13.
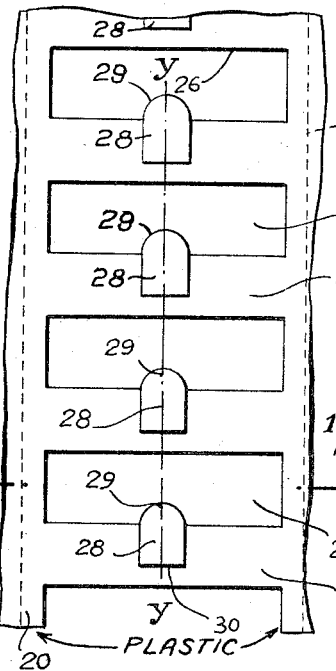
FIG.15.
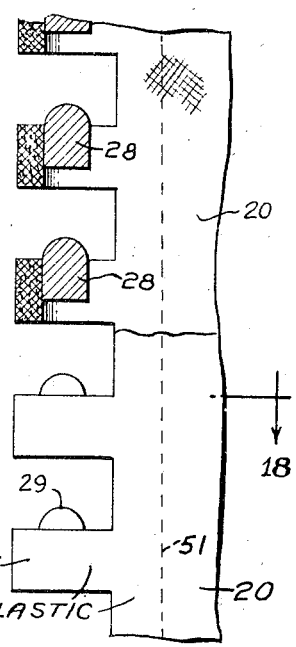
FIG.17.
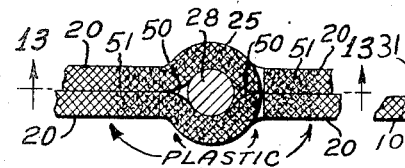
FIG.14.
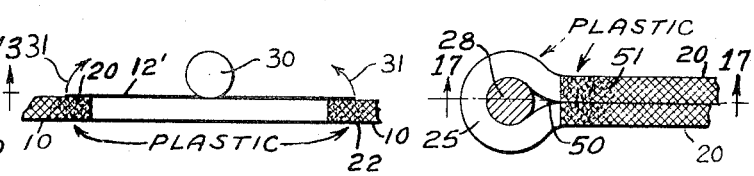
FIG.16.
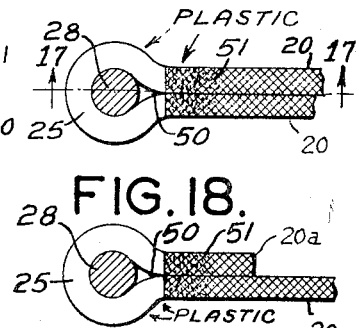
FIG.18.
FIG.19.
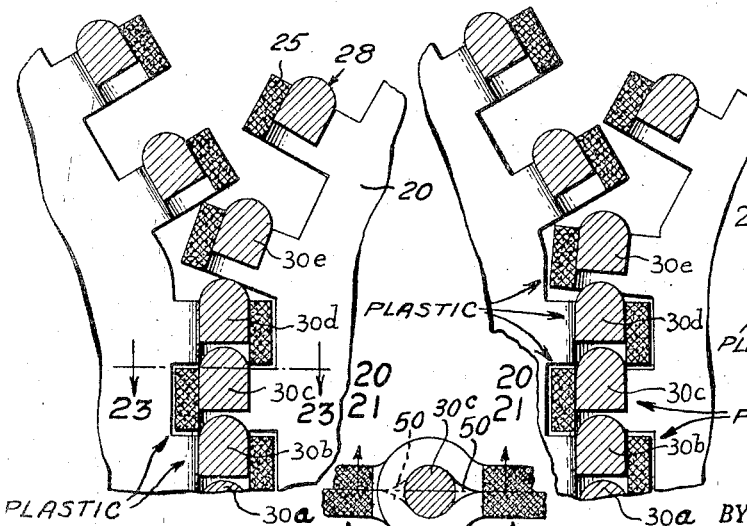
FIG.20.     FIG.21.
FIG.23.
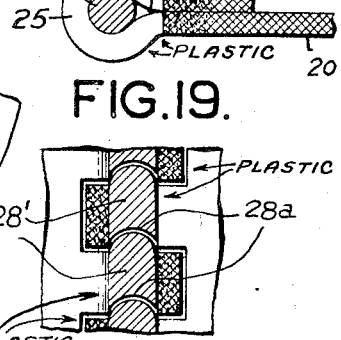
FIG.22.
INVENTOR.
FRED R. TABERLET
BY C. P. Goepel
ATTORNEY Patented Nov. 20, 1945

2,389,565

UNITED STATES PATENT OFFICE 2,389,565

NONMETALLIC SEPARABLE FASTENER AND METHOD OF MAKING THE SAME

Fred R. Taberlet, Forest Hills, N. Y.

Application November 5, 1942, Serial No. 464,582

4 Claims. (Cl. 24—205)

This invention relates to separable or slide fasteners and has for its object to provide a separable fastener which is entirely non-metallic.

The invention consists in an improved fastener in which a tape is used which has been treated with a preliminary thin coating of fluid plastic material to permeate the tape threads and fill the interstices thereof so as to stiffen the fibers of such a tape, and after the first impregnation has hardened to some extent, reinforcing the strengthened or stiffened web with a further supply of fluid plastic material in one or more further impregnations which when hardened become an integral part of the tape. The plastic material applied flows into the interstices of the textile material forming the tape, and becomes part of it. The tape with such preliminary and final material applied thereto is then subjected to a cutting-out action to provide spaces between the elements composing the fastener. After sufficient material has been added to the tape, and has been hardened and compressed by heat and pressure, the tape has sufficient resistance to enable portions thereof to form one of a plurality of separable fasteners which constitute an integral part of the tape after having been formed into loops.

The invention consists in the method described and also in the fastener which consists of spaced plastic material members in loop shape, the plastic material being part of a textile material. Various embodiments of the fastener comprise projections on the loop members, either part of the same, or enclosed thereby and such projections arranged to register with adjacent members.

The invention will be further described, embodiments thereof shown in the drawings, and the invention will be finally pointed out in the claims.

In the accompanying drawings—

Fig. 1 is a front view of my improved fastener, with parts shown in locking position and parts shown in unlocked position with a slider shown to indicate how the fastener may be separated.

Fig. 2 is an enlarged horizontal section taken on line 2—2 of Fig. 1;

Fig. 3 is a plan view of the original tape showing the preliminary impregnation and final impregnation applied thereto;

Fig. 4 is a section taken on line 4—4 of Fig. 3;

Fig. 5 is a side view of the improved fastener when in locked position with parts shown in section.

Fig. 6 is a horizontal section taken on line 6—6 of Fig. 5;

Fig. 13 shows another embodiment of the invention in which the loop is filled in, with a cylindrical plastic material instead of being empty as in Fig. 6;

Fig. 14 shows a section taken on line 14—14 of Fig. 13;

Fig. 15 shows the initial tape which is first subjected to a preliminary impregnation and then has applied thereto a plastic material to fill in the loop;

Fig. 16 is a section taken on line 16—16 of Fig. 15;

Fig. 17 is a detail side view partly in section on the line 17—17 of Fig. 18 showing only one tape;

Fig. 18 is a section of line 18—18 of Fig. 17 in which the tape portions are preferably co-extensive in size;

Fig. 19 is a similar view to that of Fig. 18, but with one tape member shorter than the other, and Figs. 20 and 21 taken on line 20, 21, in Fig. 23, show the gradual and progressive interlocking of the two locking members of the embodiment of the device shown in Figs. 13 to Fig. 19.

Fig. 22 is a sectional view of a modification.

Similar references indicate corresponding parts throughout the various views.

Figure 7:
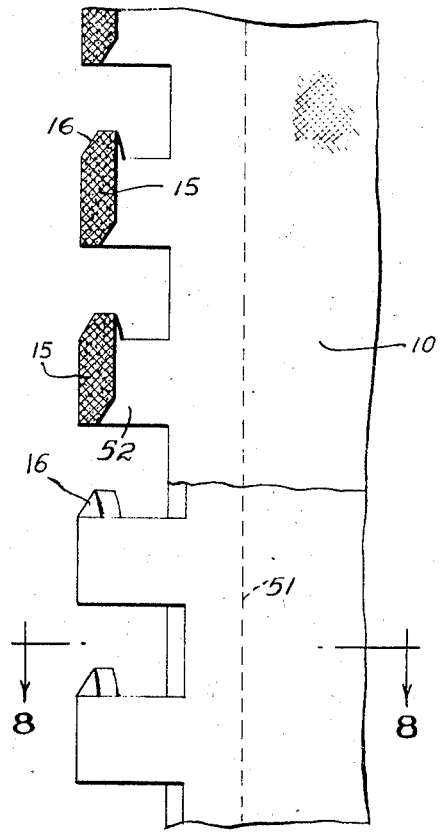
Fig. 7 is a side view partly in section of only one set of fasteners.

Referring to the drawings and more particularly to Figs. 1 to 12, the usual known tape of a texture and character such as used for tapes for separable fasteners is shown in plan view in Fig. 3 and in section in Fig. 4. Any suitable material can be used in strip form.

To this tape there is applied a suitable fluid plastic material and when dry this material when so applied to the tape stiffens the same and prevents any unthreading of the web of the tape or the fibers to split at a cut out when the tape is cut. The general contour of such a preliminary stiffening material or impregnation as applied to a tape is indicated by the dotted lines 12. This fluid plastic material permeates the threads of the tape and also enters into the interstices between the threads, so that this plastic material becomes an integral part of the tape. After this material is dry a further supply of plastic material is applied to the first and it is supplied with sufficient thickness necessary to carry out the sections hereinafter described. The lateral extensions 13 generally indicate this additional supply over the prime supply indicated by 12 in Fig. 3. Such a plastic may be of any of the known types now on the market. The plastic impregnations form a continuous band along the longitudinal line of the tape, in that they are integral with the tape. Each upper impregnation forms a bond with the adjacent lower one so as to form an integral mass. Cutting dies are then applied to the tape with this plastic adhering thereto, the shape of the cutting die being indicated by the configuration 14 of Fig. 3, which configuration has an upper edge 14a substantially straight with curved corners 14b, the side walls 14c being substantially straight and the walls opposite to the straight wall 14a indicated by 14d also being straight, but with a curved portion 14e in the central part of the cut-out so that this curved portion 14e extends into the space formed by the cut-out die. Thereupon this tape with the separated members 15 of plastic material is bent along the median line X—X, Fig. 3 in such a way as to provide a curved hollow space or bore at the interior of the bent portion. This bending is carried out under heated dies, which cause the bent portions to remain in the desired form as shown in Figs. 7 and 8 the adjacent web portions secured to each other.

Figure 8:
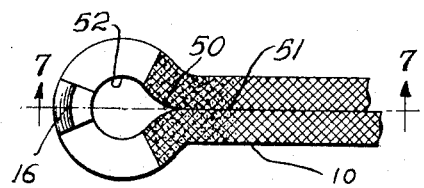
Fig. 8 is a horizontal section taken on line 8—8 of Fig. 7 the tape portions being co-extensive.

The lateral portions of the tape as shown in Figs. 3 and 8 and as further shown in broken-away form, may be co-extensive in length so that they overlap with edge to edge similar to Fig. 18, or one of the said portions of the tape may be cut away so that the remaining part of the tape is less in length than the other side of the tape as in Fig. 19. Such varying length is not important, what is important is the extent of the impregnation as shown. These two lateral portions of the tape are joined by the adhesive quality of the plastic when softened by being melted by the forming tools. In Fig. 2, the tape 10 is broken away to indicate any suitable length such as is customary in this art, and the other tape is cut away as indicated by 10a, wherein in Fig. 6 both overlapping portions of the tape are broken away to indicate any suitable length, or that the tapes end at the same place. These alternate forms are described for the sake of completeness, but no invention is claimed therein.

Portions of the length of these tapes are then interlocked with each other in the usual manner as shown in Figs. 1, 2, 5 and 6. When so interlocked, the projective portion 14e engages the loop opening of the intruding adjacent other tape and an action of interlocking thereby results as in Figures 5 and 6. To facilitate this action, the formed members 15 of Fig. 5 are beveled off as at 16 so as to enable these to take the position and contour such as shown in Fig. 1.

Figure 10:
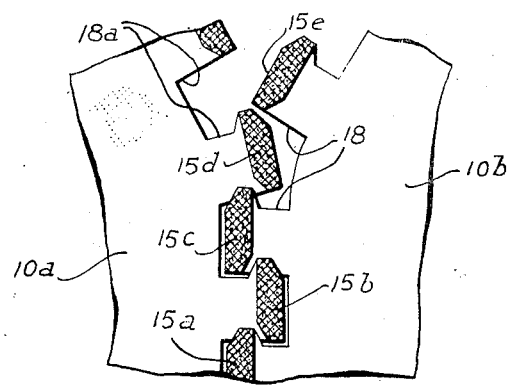
Figs. 10, 11 and 12 are diagrammatic views showing the action of the parts of the fasteners while they lock within each other, such locking action being shown progressively from Fig. 10 to Fig. 12.
Figure 11:
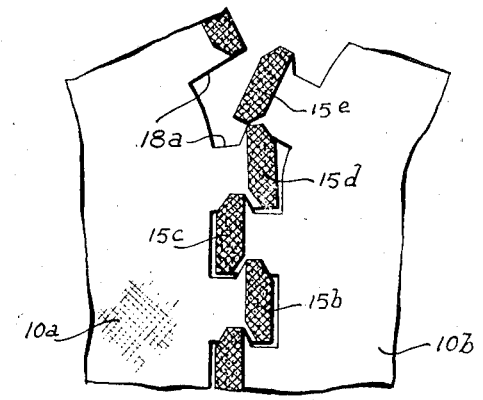
Figure 12:
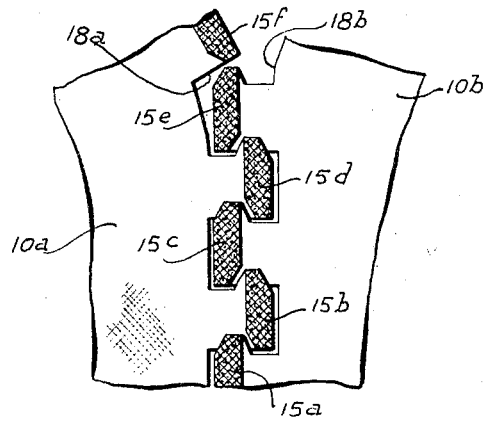
Figure 9:
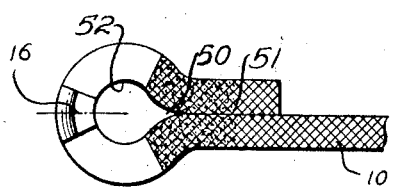
Fig. 9 is a similar section showing, however, one part of the tape shorter than the other part.

Referring now to Figs. 7 to 12, Fig. 7 shows one of these tapes 10 with a plastic member 15, made a part thereof, and with the upper portions beveled off as shown by 16. Figs. 8 and 9 are plan views of the structure shown in Fig. 7, in so far as the plastic member is concerned, but Figure 8 shows the co-extensive tape ends and Fig. 9 shows one tape end shorter than the other. In Fig. 10 the interlocking action just described is shown. Members 15a, 15b, and 15c are shown as interlocked. In Fig. 10 the member 15d is just entering the space 18 of the tape 10b and the member 15e is about to be moved over into the space 18a. In Fig. 11 the member 15d is engaged in the space 18, but the locking action is not entirely complete, and the member 15e has progressed to the space 18a still further than as shown in Fig. 10. In Fig. 12 the member 15d is entirely interlocked with the space 18 of the tape 10b and the spaced member 15e has engaged into the space 18a of the tape portion 10a, the member 15f progressively moving down to engage the next space 18b.

Referring now to the other embodiment of this invention shown in Figs. 13 to 22, a tape 20 having a median line y—y is again preliminarily prepared as indicatedf by the dotted lines 22 in Fig. 15 with a fluid plastic which when dry stiffens and forms a continuous band of plastic material along the central portion of the tape 20. Thereupon more fluid plastic material is applied to this band, and then a die is applied to cut out the opening 26. This method is the same as heretofore described. With the tape thus provided with rectangular panels 25 impregnated with plastic material, extending around the openings 26, cylindrical members 28 of hardened plastic material are suitably secured to the panels 25. Each member 28 has a curved portion 29 extending into the space 26 as shown in Fig. 15. The base portion of this cylindrical member 28 is shown at 30 in Fig. 16. This tape shown in Figs. 15 and 16 is then curved or bent into loop shape by heated formers; arrows 31 showing the direction of movement of the lateral portions of this tape to wrap them around the cylindrical members 28, as shown in Figs. 18 and 19, which shows this relationship the same in both Figures, the only difference between Figs. 18 and 19 being that in one case the ends of the tapes match each other in length, whereas in Fig. 19 the tape 20a is cut off. The heat of the forming dies causes the plastic material to cement the lateral portions of the tape together. Preferably the cylindrical member 28' at its base has a curved cut-out 28a into which the curved portion 29 of the adjacent cylindrical member may seat itself as shown in Fig. 22.

When one of these tape members as described in connection with Figs. 15 an 16 is bent upon itself, the side view thereof is indicated by Fig. 17. When two members of like character are matched with each other but offset from each other vertically the distance of one of these plastic panels 25 with curved extension 29, then a structure shown in side view and partly in section results such as shown in Fig. 13, a horizontal section taken on line 14—14 being shown in Fig. 14.

It will be noted that the cylindrical member closes the loop opening whereas in the first embodiment the loop space is not closed. Other forms of loop closers may be used.

In Figs. 20 and 21, the interlocking action of these parts is shown, and it will be noted that in Fig. 20, the lowermost cylindrical members 30a, 30b and 30c are entirely interlocked. The member 30d is about to be completed in its interlocking action with the member 30e tending towards interlocking in Fig. 20, whereas in Fig. 21 the member 30e has progressed still further into its interlocking action, thereby also still further completing the locking action of the member 30d.

From the foregoing it will have been seen that the method of forming a separable or slide fastener consists in applying longitudinally to a tape of textile material, a preliminary layer of fluid plastic material, and then applying further fluid plastic material to the desired thickness. The first fluid plastic material applied permeates and impregnates the tape so as to become an integral part thereof, then the additional plastic material builds up the thickness to enable the plastic material when shaped during bending to perform the functions of an interlocking fastener. The preliminary structure so formed may be provided with an inherent extension, preferably of curved form, or it may have a separate seat applied thereto, and wrapped by the hardened tape.

The present invention differs from known devices in that in the earlier devices the locking members are separately made and then applied to the tape, whereas under the present invention the members are formed by the fabric itself.

The invention described includes also a novel product in that the plastic material forms the separable fastener itself as an inherent part of the tape.

It will be noted that no metal is used, the separable fasteners being entirely made of the suitable tape and the fluid plastic material applied thereto.

From the foregoing it is believed that the construction, operation and advantages of the invention may be readily understood by those skilled in the art without further description, it being borne in mind that numerous changes may be made in the details disclosed without departing from the spirit of the invention as set out in the appended claims.

I claim:

1. A nonmetallic separable fastener, comprising a pair of strips of textile fabric, each having spaced cylindrical loop portions and overlapping portions permanently secured to each other, and each loop portion having a projection thereon, all impregnated with plastic material substantially flush with the surfaces of said fabric, the loop portions of one strip entering the spaces between the loop portions of the other strip, and the projection of one loop portion of one strip engaging the loop bore of the next adjacent loop portion of the other strip.

2. A nonmetallic separable fastener, comprising a pair of strips of textile fabric, each having spaced cylindrical loop portions and overlapping portions permanently secured to each other, and each loop portion having a projection thereon, all impregnated with plastic material substantially flush with the surfaces of said fabric, the loop portions of one strip entering the spaces between the loop portion of the other strip, and the projection of one loop portion of one strip engaging the loop bore of the next adjacent loop portion of the other strip, each of said projections being an integral part of each plastic material cylindrical loop portion.

3. A nonmetallic separable fastener, comprising a pair of strips of textile fabric, each having spaced cylindrical loop portions and overlapping portions permanently secured to each other, impregnated with plastic material substantially flush with the surfaces of said fabric, and each loop portion having a projection of plastic material thereon, the loop portions of one strip entering the spaces between the loop portions of the other strip, and the projection of one loop of one strip engaging the bore of the next adjacent loop portion of the other strip, said projection being within the loop, each loop portion being wrapped around the body of the projection with the projection extending above the loop portion.

4. A nonmetallic separable fastener, comprising a pair of strips of textile fabric, each having spaced cylindrical loop portions and overlapping portions permanently secured to each other, impregnated with plastic material substantially flush with the surfaces of said fabric, and each loop portion having a projection thereon, the loop portions of one strip entering the spaces between the loop portions of the other strip, and the projection of one loop of one strip engaging the bore of the next adjacent loop portion of the other strip, the upper part of each projection being convexly rounded and the lower part of each projection being concavely rounded, to enable the convex end to engage the concave end of the projection of the next adjacent loop portion, each of said projections being cylindrical in shape and each disposed in each bore of the loop portions.

FRED R. TABERLET.